(12) United States Patent
Tominaga et al.

(10) Patent No.: US 12,091,120 B2
(45) Date of Patent: Sep. 17, 2024

(54) HANDLE SWITCH DEVICE

(71) Applicants: TOYO DENSO KABUSHIKI KAISHA, Tokyo (JP); HONDA MOTOR CO., LTD., Tokyo (JP)

(72) Inventors: Yusuke Tominaga, Tsurugashima (JP); Yuichi Shimizu, Tsurugashima (JP); Noritaka Kimura, Bangrak (TH); Naoyuki Yamate, Ladkrabang (TH)

(73) Assignees: TOYO DENSO KABUSHIKI KAISHA, Tokyo (JP); HONDA MOTOR CO., LTD., Tokyo (JP)

( * ) Notice: Subject to any disclaimer, the term of this patent is extended or adjusted under 35 U.S.C. 154(b) by 588 days.

(21) Appl. No.: 17/391,073

(22) Filed: Aug. 2, 2021

(65) Prior Publication Data

US 2022/0041241 A1    Feb. 10, 2022

(30) Foreign Application Priority Data

Aug. 6, 2020 (JP) ................. 2020-133826

(51) Int. Cl.
*B62J 45/00* (2020.01)
*H01R 13/52* (2006.01)

(52) U.S. Cl.
CPC .......... *B62J 45/00* (2020.02); *H01R 13/5213* (2013.01); *H01R 2201/26* (2013.01)

(58) Field of Classification Search
CPC .. B62J 45/00; H01R 13/5213; H01R 2201/26; H01R 24/60; H01R 2107/00; B62K 11/14
See application file for complete search history.

(56) References Cited

U.S. PATENT DOCUMENTS

| | | | |
|---|---|---|---|
| 2018/0156631 A1* | 6/2018 | Huard | B62K 21/26 |
| 2018/0334216 A1* | 11/2018 | Montez | B62J 50/225 |
| 2020/0185939 A1* | 6/2020 | Gladstone | B62K 11/14 |
| 2022/0052495 A1* | 2/2022 | Tominaga | B60L 53/14 |

FOREIGN PATENT DOCUMENTS

| | | |
|---|---|---|
| CN | 202474932 U | 10/2012 |
| CN | 203158146 U | 8/2013 |
| CN | 204688325 U | 10/2015 |
| CN | 109334838 A | 2/2019 |
| JP | 2014-080181 A | 5/2014 |
| JP | 2017-121836 A | 7/2017 |
| JP | 2017-159677 A | 9/2017 |

OTHER PUBLICATIONS

Official Communication issued in corresponding Indian Patent Application No. 202114033986, mailed on Jun. 22, 2022.

* cited by examiner

*Primary Examiner* — Kevin Hurley
*Assistant Examiner* — Marlon A Arce
(74) *Attorney, Agent, or Firm* — Keating & Bennett, LLP

(57) ABSTRACT

A handle switch device that prevents a user from being bothered when supplying power, and enables a user to easily check a connection state of a power cord. A handle switch device 10 to be attached to a handlebar 11 of a vehicle 21 is provided with a USB port 18 for supplying power to an external device, and the USB port 18 is directed inwardly with respect to a width direction of a vehicle 21 in a state in which the handle switch device 10 is attached to the handlebar 11.

7 Claims, 4 Drawing Sheets

HANDLE SWITCH DEVICE

BACKGROUND OF THE INVENTION

Field of the Invention

The present invention relates to a handle switch device attached to a handlebar of a vehicle.

Description of the Related Art

In recent years, in saddle-riding vehicles, for example, two-wheel vehicle, a mobile device on which a navigation application is installed is often used as a navigation device. In this case, the mobile device is attached to a handlebar of a vehicle via a mount. Here, since the navigation application continues to be used while driving, power consumption may increase and a charging amount of a battery of the mobile device may be zero.

Therefore, while the navigation application is in use, power is always supplied to the mobile device from a battery or a generator of a vehicle. As a method of supplying power to a mobile device, for example, a method in which attaching a pipe-shaped charging adapter for accommodating a transformer to a vehicle, connecting the transformer to a vehicle power supply, and supplying power from a connection terminal connected to the transformer via a power cord is known (for example, see Japanese Laid-Open Patent Publication No. 2017-159677).

However, the method described in Japanese Laid-Open Patent Publication No. 2017-159677 is not convenient for a user because it is necessary to separately prepare a charging adapter and further fix the charging adapter to a top bridge, for example, by a screw or the like. In addition, since a digital meter or the like that matches an impression of the vehicle is disposed near the top bridge, when the pipe-shaped charging adapter is disposed there, the appearance around the handle may deteriorate due to the lack of unity in the design.

Therefore, for example, in a scooter type two-wheel vehicle, a method has been proposed in which a power socket is provided in a goods storage of a front leg shield and power is supplied from the power socket to a mobile device via a power cord (for example, see Japanese Laid-Open Patent Publication No. 2014-80181).

With the method described in Japanese Laid-Open Patent Publication No. 2014-80181, it is not necessary to attach the charging adapter to the vehicle body, which prevents the user from being bothered when supplying power, and further, a power cord is almost stored in the goods storage, which makes it possible to prevent the appearance from deteriorating.

However, in the method described in Japanese Laid-Open Patent Publication No. 2014-80181, the power cord is connected to the power socket in the goods storage, and thus a user cannot easily check whether a power cord is securely connected to a power socket.

SUMMARY OF THE INVENTION

The present invention provides a handle switch device that does not bother a user when supplying power and allows the user to easily check a connection state of a power cord.

Accordingly, an aspect of the present invention provides a handle switch device configured to be attached to a handlebar of a vehicle, the handle switch device comprising a switch housing provided with a switch and a connection terminal which is provided in the switch housing and supply power to an external device, in which the connection terminal is directed inwardly with respect to a width direction of the vehicle.

According to the present invention, since the handle switch device to be attached to the handlebar of the vehicle comprises the connection terminal for supplying power to the external device, it is not necessary to provide a charging adapter or the like for supplying power to the external device, which prevents the user from being bothered when supplying power. Further, since the connection terminal is directed inwardly with respect to the width direction of the vehicle, a user sitting on a center line of a vehicle can easily check the connection state between the connection terminal and the power cord of the external device.

Further features of the present invention will become apparent from the following description of exemplary embodiments with reference to the attached drawings.

DESCRIPTION OF THE EMBODIMENTS

Hereinafter, embodiments of the present invention will be described in detail with reference to the drawings.

Figure 1:
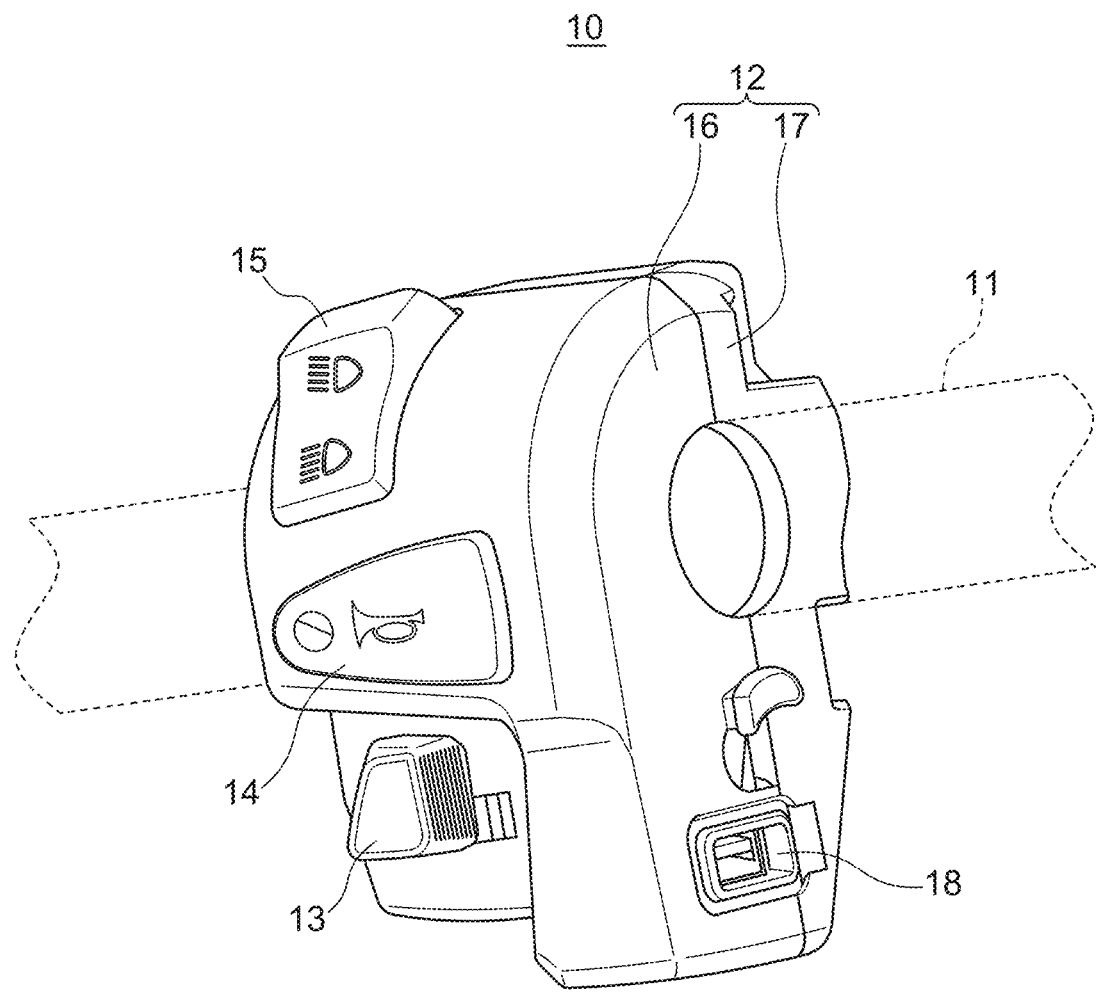
FIG. 1 is a perspective view schematically illustrating an appearance of a handle switch device according to an embodiment of the present invention.

FIG. 1 is a perspective view schematically illustrating an appearance of a handle switch device 10 according to an embodiment of the present invention. In FIG. 1, the handle switch device 10 includes a case-shaped switch housing 12 that is attached to a cylindrical handlebar 11 (illustrated by a broken line). The switch housing 12 is provided with a winker switch 13, a horn switch 14, and a dimmer switch 15, which receive an operation input of, for example, a driver who is a user.

Further, the switch housing 12 is provided with a front housing 16 disposed on a driver side (hereinafter, also referred to as "rear side in a vehicle direction") with respect to a traveling direction of a vehicle and a rear housing 17 that is disposed on an opposite side (hereinafter, also referred to as "front side in a vehicle direction") to a driver with respect to the traveling direction of the vehicle. The front housing 16 and the rear housing 17 are fastened to each other by two screws (not illustrated), and are attached to the handlebar 11 by sandwiching the handlebar 11.

Further, the handle switch device 10 is provided with a USB port 18 which is a connection terminal conforming to the USB (universal serial bus) standard. The USB port 18 is provided on a substrate (not illustrated) having electronic components such as a transformer and being housed in the switch housing 12, and is connected to a vehicle power supply, for example, a battery or a generator via the substrate. It should be noted that the electronic components such as the transformer interposed between the USB port 18 and the vehicle power supply may be mounted on another substrate housed in a vehicle body, for example, a substrate mounted on the vehicle as a vehicle control ECU.

Then, the USB port 18 supplies power to an external device via a USB connector 20 of a power cord 19 inserted into the USB port 18. The USB port 18 is disposed around the handlebar 11 in a state in which the handle switch device 10 is attached to the handlebar 11.

For example, the USB port 18 is disposed below the handlebar 11 in a state in which the handle switch device 10 is attached to the handlebar 11. In this case, the handlebar 11 acts as a rain shield for the USB port 18, prevents the USB port 18 from getting wet by rain or the like, thereby preventing rainwater or the like from entering the USB port 18. In this case, since the driver looks at the USB port 18 from diagonally behind the handlebar 11, even if the USB port 18 is disposed below the handlebar 11, the handlebar 11 does not hide the USB port 18 from the driver.

Examples of external devices to which the USB port 18 supplies power include small-sized navigation devices, in-vehicle devices for electronic toll collection systems, mobile devices such as smartphones, action cameras, intercoms, drive recorders, altimeters, and heat warmers.

Figure 2:
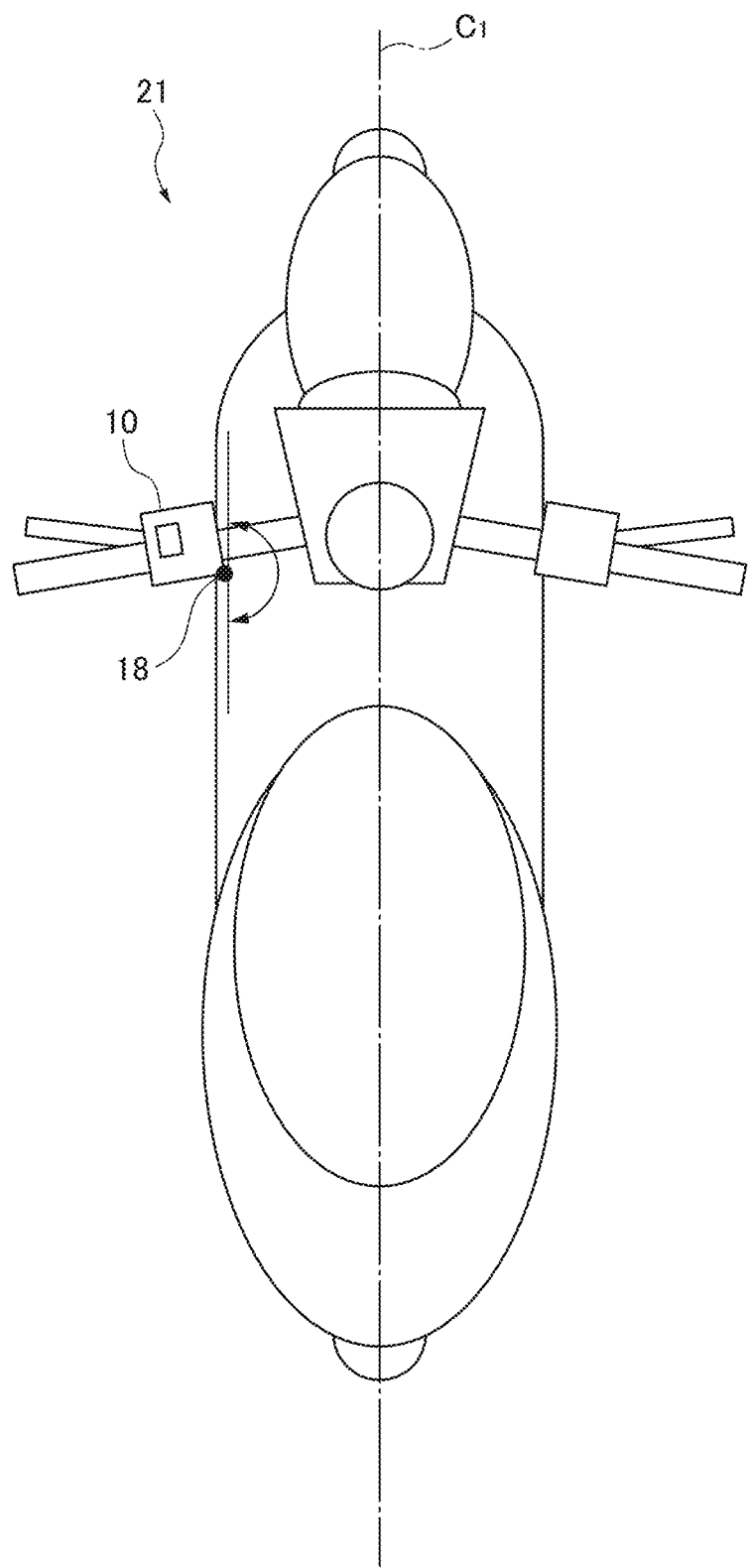
FIG. 2 is a plan view for describing a facing direction of a USB port.

Further, the USB port 18 is directed inwardly with respect to a width direction of a vehicle 21 in a state in which the handle switch device 10 is attached to the handlebar 11. FIG. 2 is a plan view for describing facing direction of the USB port 18. FIG. 2 illustrates a vehicle 21 which is a bar-handle type motorcycle.

In FIG. 2, the position of the USB port 18 of the handle switch device 10 is indicated by "●". The inside of the vehicle 21 in the width direction in the present embodiment refers to a center line $C_1$ side of the vehicle 21, and a state in which "the USB port 18 is directed inwardly with respect to the width direction of the vehicle 21" means the state in which the USB port 18 is directed in a range (a range indicated by an arrow in the figure) of 0° to 180° with respect to the center line $C_1$ in a straight-running state of the vehicle 21, that is, in a state in which the handle is not turned. Therefore, a driver seated on the center line $C_1$ of the vehicle 21 can face the USB port 18 and can easily see the USB port 18.

Figure 3:
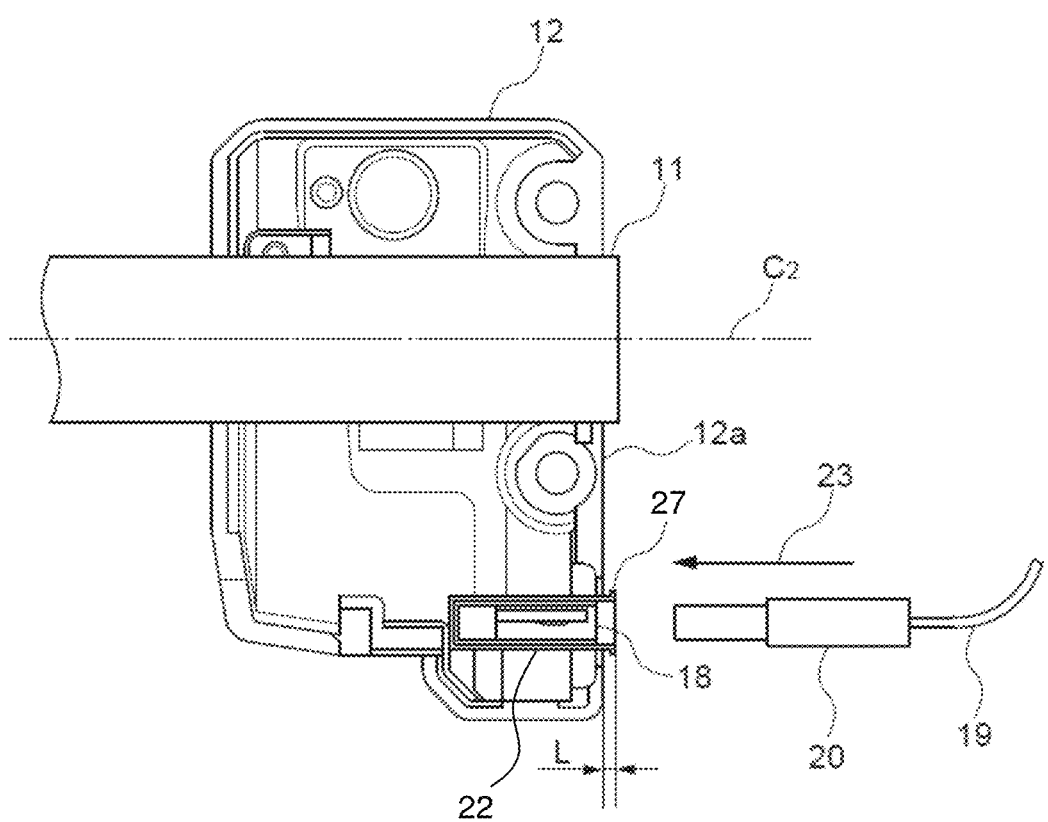
FIG. 3 is a view of a handle switch device from a driver's side in a state in which a front housing removed.

FIG. 3 is a view of the handle switch device 10 from a driver's side in a state in which the front housing 16 removed. To facilitate understanding of the structure around the USB port 18, some of the structures housed in the switch housing 12 are omitted in FIG. 3.

In FIG. 3, the USB port 18 is covered with a case 22 inside the switch housing 12. One end of the case 22 is opened to expose the USB port 18. Further, the one end of the case 22 has an opening protruding inwardly from a side surface 12a of the switch housing 12 with respect to the width direction of the vehicle 21, and a flange 27 surrounding the opening. A protrusion amount L of the case 22 from the side surface 12a of the switch housing 12 is 5 mm or less. When the case 22 is not provided, one end of the USB port 18 may protrude inwardly from the side surface 12a of the switch housing 12 with respect to the width direction of the vehicle 21.

Further, as illustrated in FIG. 3, the USB port 18 is disposed so that an insertion direction 23 (indicated by an arrow in the figure) of the USB connector 20 of the power cord 19 is disposed to be substantially parallel to a center line $C_2$ of the handlebar 11. Here, the "substantially parallel" means a state in which an angle formed by the insertion direction 23 with respect to the center line $C_2$ is within ±5°.

Figure 4:
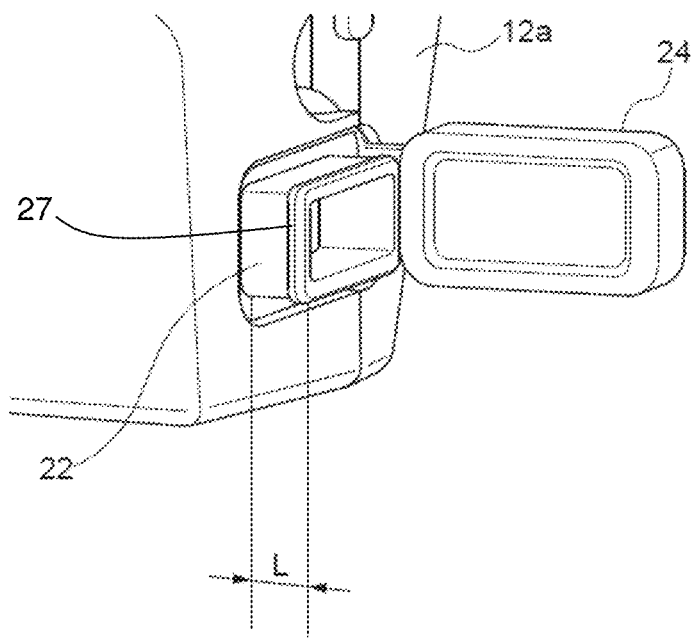
FIG. 4 is a diagram for describing a waterproof lid included in the handle switch device.

Further, the handle switch device 10 includes a waterproof lid 24 that can be attached to and detached from the case 22 of the USB port 18, as illustrated in FIG. 4. The waterproof lid 24 is formed of a waterproof soft member such as rubber. When the USB connector 20 is not inserted into the USB port 18, the waterproof lid 24 can cover the opening of the case 22 that protrudes from the side surface 12a of the switch housing 12. It should be noted that when the case 22 is not provided, the waterproof lid 24 covers one end of the USB port 18.

According to the present embodiment, since the handle switch device 10 is provided with the USB port 18, it is not necessary to provide a charging adapter or the like for supplying power to the external device, which prevents the user from being bothered. Also, since the handle switch device 10 is not stored inside the vehicle 21 and the USB port 18 is directed inwardly with respect to the width direction of the vehicle 21 in the state in which the handle switch device 10 is attached to the handlebar 11, the driver sitting on the center line $C_1$ of the vehicle 21 can easily check the connection state of the USB port 18 and the power cord 19 of the external device. Further, since a top bridge 25 or the like is not provided with the charging adapter or the like, it is possible to prevent the appearance around the handle from deteriorating.

In addition, the external device is usually attached to the top bridge 25 or a gasoline tank 26 positioned inwardly from the handlebar 11 with respect to the width direction of the vehicle 21 via a mount or the like. On the other hand, in the present embodiment, since the USB port 18 is directed inwardly with respect to the width direction of the vehicle 21 in the state in which the handle switch device 10 is attached to the handlebar 11, it is easy to route the power cord 19 connected to the USB port 18. As a result, it becomes easy to insert the power cord 19 into the USB port 18 of the USB connector 20, it is possible to simplify the wiring form of the power cord 19, and it is possible to prevent the appearance from deteriorating.

Further, in the present embodiment, since the USB port 18 is covered with the case 22, and the case 22 protrudes from the side surface 12a of the switch housing 12, it is possible to prevent rainwater or the like traveling along the side surface 12a of the switch housing 12 from entering the USB port 18. In particular, when the USB connector 20 is not inserted into the USB port 18, the opening of the case 22 is covered with the waterproof lid 24, which reliably prevents water and dust from entering the USB port 18.

Further, in the present embodiment, since one end of the case 22 protrudes from the side surface 12a of the switch housing 12, inwardly with respect to the width direction of the vehicle 21, the protruding one end guides the USB connector 20. As a result, it is possible to easily insert the USB connector 20 into the USB port 18. In particular, the driver may insert the USB connector 20 into the USB port 18 by searching to find one end of the protruding case 22 with a finger or the like without directly looking at the USB port 18, which improves the usability for the driver.

It should be noted that, since the protrusion amount L of the case 22 from the side surface 12a of the switch housing 12 is 5 mm or less, the protruding portion of the case 22 is not conspicuous, and the appearance of the handle switch device 10 does not deteriorate.

Further, in the present embodiment, since the insertion direction 23 of the USB connector 20 into the USB port 18 is substantially parallel to the center line $C_2$ of the handlebar 11, the driver can insert the USB connector 20 into the USB port 18 using the handlebar 11 as a guide, that is, the usability for the driver can be improved. Further, the handlebar 11 is upward disposed inwardly with respect to the width direction of the vehicle 21, and as a result, the USB port 18 is also disposed upward. As a result, it is possible for the driver to more easily check the connection state between the USB port 18 and the power cord 19 of the external device.

Although the preferable embodiment of the present invention was described above, the present invention is not limited to embodiment described above, and can be variously modified and changed without departing from the scope of the present invention.

For example, in the present embodiment described above, the present invention may be applied to the handle switch device 10 to be attached to the handlebar 11 on the left side of the vehicle 21, but the present invention may be applied to the handle switch device to be attached to the handlebar 11 on the right side of the vehicle 21.

Further, in the present embodiment, the USB port 18 may be disposed above the handlebar 11 or on the rear side in the vehicle direction with respect to the handlebar 11 in the state in which the handle switch device 10 is attached to the handlebar 11. In this case, since the USB port 18 is not hidden by the handlebar 11 from the driver, the USB port 18 can be easily seen by the driver.

Further, in the present embodiment, the USB port 18 may be disposed in front side in the vehicle direction with respect to the handlebar 11. In this case, it is difficult for the driver to reach the USB port 18 by driver's hand, especially the driver's finger, which suppresses the USB connector 20 inserted into the USB port 18 from being undesirably removed from the USB port 18 due to the contact with the driver's hand.

Although in the present embodiment, the case where the present invention is applied to a bar handle type motorcycle has been described, the present invention may be applied to a separate handle type motorcycle.

Further, although the handle switch device 10 according to the present embodiment is applied to a motorcycle, the vehicle to which the handle switch device 10 can be applied is not limited to the motorcycle, and the handle switch device 10 can be applied as long as the vehicle has the handlebar. Examples of the vehicles to which the handle switch device 10 may applied to include so-called saddle-riding vehicles, which include three-wheeled vehicles, four-wheeled vehicles classified as all terrain vehicles (ATVs), and snowmobiles. In addition, the handle switch device 10 can also be applied to a sliding type saddle-riding small vessel equipped with a handle.

This application claims the benefit of Japanese Patent Application No. 2020-133826 filed on Aug. 6, 2020 which is hereby incorporated by reference herein in its entirety.

What is claimed is:

1. A handle switch device configured to be attached to a handlebar of a vehicle, the handle switch device comprising:
   a switch housing provided with a switch; and
   a connection terminal which is provided in the switch housing and supplies power to an external device,
   a case inside the switch housing and covering the connection terminal, the case including a protrusion that protrudes from the switch housing so as to, when a connector is inserted into the connection terminal, guide the connector into the connection terminal, and
   a waterproof lid that is attachable to and detachable from the case, wherein
   the connection terminal is directed inwardly with respect to a width direction of the vehicle,
   an end of the protrusion includes an opening and a flange surrounding the opening, the flange being spaced apart from the switch housing, and
   the waterproof lid is configured to close the opening of the protrusion to prevent the connection terminal from getting wet.

2. The handle switch device according to claim 1, wherein the connection terminal is disposed below the handlebar.

3. The handle switch device according to claim 1, wherein the connection terminal is disposed above the handlebar or on a rear side in a vehicle direction with respect to the handlebar.

4. The handle switch device according to claim 1, wherein the connection terminal is disposed in front side in a vehicle direction with respect to the handlebar.

5. The handle switch device according to claim 1, wherein a protrusion amount of the protrusion of the case from the switch housing is 5 mm or less.

6. The handle switch device according to claim 1, wherein the connection terminal is disposed so that an insertion direction of a power cord connected to the external device is substantially parallel to a center line of the handlebar.

7. The handle switch device according to claim 1, wherein the connection terminal is a terminal that conforms to a USB standard.

* * * * *